(12) United States Patent
Shen et al.

(10) Patent No.: US 12,397,614 B2
(45) Date of Patent: Aug. 26, 2025

(54) TESTING DEVICE AND METHOD FOR SERVICE LIFE OF REFRIGERATION COMPRESSOR OF NEW ENERGY VEHICLE RUNNING WITH PURE GAS

(71) Applicant: ZHEJIANG UNIVERSITY OF TECHNOLOGY, Zhejiang (CN)

(72) Inventors: Xi Shen, Zhejiang (CN); Jiangping Gu, Zhejiang (CN); Yuejin Huang, Zhejiang (CN); Huaqiang Jin, Zhejiang (CN); Zhe Sun, Zhejiang (CN); Jihui Zheng, Zhejiang (CN); Kang Li, Zhejiang (CN); Ling Shi, Zhejiang (CN); Wei Hang, Zhejiang (CN); Hongyu Chen, Zhejiang (CN)

(73) Assignee: ZHEJIANG UNIVERSITY OF TECHNOLOGY, Zhejiang (CN)

( * ) Notice: Subject to any disclaimer, the term of this patent is extended or adjusted under 35 U.S.C. 154(b) by 417 days.

(21) Appl. No.: 18/087,814

(22) Filed: Dec. 23, 2022

(65) Prior Publication Data
US 2024/0166017 A1    May 23, 2024

(30) Foreign Application Priority Data
Nov. 23, 2022    (CN) .......................... 202211474795.0

(51) Int. Cl.
*B60H 1/00* (2006.01)
*F04B 49/06* (2006.01)
(Continued)

(52) U.S. Cl.
CPC .......... *B60H 1/00585* (2013.01); *F04B 49/06* (2013.01); *F04B 51/00* (2013.01);
(Continued)

(58) Field of Classification Search
CPC .... B60H 1/00585; F25B 49/022; F25B 49/02; F25B 2700/151; F04B 49/06; F04B 51/00; F24F 11/38; F24F 11/52
See application file for complete search history.

(56) References Cited

U.S. PATENT DOCUMENTS 4,236,379 A * 12/1980 Mueller .................. F25B 49/02
62/472

FOREIGN PATENT DOCUMENTS

CN    101498297 A  *  8/2009
CN    201461368 U  *  5/2010
(Continued)

*Primary Examiner* — Jonathan M Dunlap
(74) *Attorney, Agent, or Firm* — JCIPRNET

(57) ABSTRACT

Disclosed is a testing device and method for a service life of an air-conditioning compressor of a new energy vehicle running with pure gas. The testing device includes an alternative refrigeration system, a measurement and control system, and a testing environment room. A main refrigeration cycle system of the alternative refrigeration system runs with pure gas, gas of a testing compressor is discharged via a discharge throttle valve, and then enters a suction end via a suction throttle valve and an electronic expansion valve, and since there is no phase change, a heat exchange amount is small; adjustable ranges of the discharge throttle valve, the suction throttle valve and the electronic expansion valve are wide; and based on the system structure, a small refrigeration system can be used to test a compressor having high cooling capacity, and the system can quickly achieve a target working condition with a small amount of refrigerant.

9 Claims, 11 Drawing Sheets

(51) Int. Cl.
  *F04B 51/00*      (2006.01)
  *F24F 11/38*      (2018.01)
  *F24F 11/52*      (2018.01)
  *F25B 49/02*      (2006.01)

(52) U.S. Cl.
  CPC .............. *F24F 11/38* (2018.01); *F24F 11/52* (2018.01); *F25B 49/02* (2013.01); *F25B 49/022* (2013.01); *F25B 2700/151* (2013.01)

(56) References Cited

FOREIGN PATENT DOCUMENTS

| | | | | |
|---|---|---|---|---|
| CN | 201531406 U | * | 7/2010 | |
| CN | 106014946 A | * | 10/2016 | .............. F04B 49/06 |
| CN | 106596154 A | * | 4/2017 | |
| CN | 111140488 A | * | 5/2020 | .............. F04B 51/00 |
| WO | WO-2019239549 A1 | * | 12/2019 | .............. F24F 11/38 |

\* cited by examiner

TESTING DEVICE AND METHOD FOR SERVICE LIFE OF REFRIGERATION COMPRESSOR OF NEW ENERGY VEHICLE RUNNING WITH PURE GAS

CROSS-REFERENCE TO RELATED APPLICATION

This application claims the priority benefit of China application no. 202211474795.0, filed on Nov. 23, 2022. The entirety of each of the above mentioned patent applications is hereby incorporated by reference herein and made a part of this specification.

TECHNICAL FIELD

The present disclosure belongs to the technical field of device and method, and particularly relates to a testing device and method for a service life of an air-conditioning compressor of a new energy vehicle running with pure gas.

BACKGROUND ART

With increasingly prominent environmental and energy issues of traditional fuel vehicles, governments all over the world have begun to attach importance to development of new energy vehicles. The new energy vehicle industry has entered an era of rapid global development. With characteristics of environmental protection, energy saving, and high efficiency, new energy vehicles will gradually become preferred means of transportation for people.

An air-conditioning system is an important part of a new energy vehicle. A compressor is further a core component of the air-conditioning system of the new energy vehicle. The importance of its service life is self-evident. Therefore, it is necessary to conduct a strict service life test on the compressor before delivery so as to ensure reliability of the compressor. At present, because of a low intelligent degree of a compressor life test apparatus, working conditions need to be switched manually, and a heat exchange amount of a system is large. Many of them need water-cooled units. Therefore, it is necessary to develop a compressor life test apparatus with a high intelligent degree and a small heat exchange amount of a system to conduct reliable and convenient life tests. The present disclosure is conducted under such a background, and has very important practical significance.

SUMMARY

In order to overcome the defects in the prior art, the present disclosure provides a testing device and method for a service life of an air-conditioning compressor of a new energy vehicle running with pure gas.

The present disclosure provides the following technical solution: a testing device for a service life of an air-conditioning compressor of a new energy vehicle running with pure gas. The testing device includes an alternative refrigeration system, a measurement and control system, and a testing environment room.

The alternative refrigeration system includes a main refrigeration cycle system, a recovery subsystem, an air return refrigeration subsystem, an environmental refrigeration subsystem, and an auxiliary part. The main refrigeration cycle system ensures that a testing compressor runs in a set working condition, and includes the testing compressor, a first electromagnetic valve, a first discharge throttle valve, a second discharge throttle valve, a third discharge throttle valve, an intermediate buffer coil pipe, a second electromagnetic valve, a first suction throttle valve, a second suction throttle valve, an electronic expansion valve, and an air return tank. The air return tank is internally provided with an evaporation coil pipe and an electric heating pipe. The recovery subsystem is configured to recover refrigerant and includes a recovery valve, a recovery compressor, a condenser, and a recovery liquid storage tank. The recovery liquid storage tank is configured to store refrigerant. The air return refrigeration subsystem and the air return tank electric heating pipe control a suction temperature. The air return refrigeration subsystem includes an air return refrigeration compressor, a condenser, an expansion valve, and the evaporation coil pipe. The environmental refrigeration subsystem and an environmental temperature electric heating pipe control the environmental temperature of the testing compressor. The environmental refrigeration subsystem includes an environmental refrigeration compressor, a condenser, an expansion valve, and an evaporator. The auxiliary part includes a balance valve, a vacuum valve, and a charging valve.

The measurement and control system takes a programmable logic controller (PLC) as a control core, so as to achieve data measurement and system control of the testing device. The PLC is connected to a network switch so as to be in communication with a direct-current power supply, a touch screen, and an industrial control machine. The PLC is connected to a peak controller area network (PCAN)-local interconnect network (LIN) module by means of an extended RS232 interface so as to be in communication with a driver of the testing compressor, the testing compressor is controlled to be turned on and off, and a rotation speed is controlled. The PLC is connected to a relay so as to control the direct-current power supply, a recovery compressor, an environmental circulating fan, and various valves. The PLC is connected to a solid-state relay so as to control the air return tank electric heating pipe and the environmental temperature electric heating pipe. The PLC controls forward and reverse rotation of an electronic expansion valve driver so as to control a pulse number of the electronic expansion valve. The PLC is connected to a thermocouple input module by means of an RS485 interface so as to collect temperature data. The PLC is connected to an analog quantity input module by means of the RS485 interface, and the analog quantity input module is connected to a sensor so as to collect pressure, current and voltage data. The PLC is connected to the sensor by means of an extended analog quantity input/output module so as to collect current and pressure data and control output pressure of an electrical proportional valve.

The testing environment room is equipped with the testing compressor, the circulating fan is provided right above the testing environment room, and the environmental temperature electric heating pipe and an environmental refrigeration subsystem evaporator are provided on a side face of the testing environment room. The circulating fan is configured to ensure air circulation in the testing environment room so as to achieve uniform temperature distribution in the testing environment room. The environmental temperature electric heating pipe and the environmental refrigeration subsystem evaporator are configured to control a temperature of the testing environment room so as to achieve arbitrary control of the temperature of the testing environment room in a range of −30° C.-120° C.

The measurement and control software of the testing device for a service life of an air-conditioning compressor of a new energy vehicle has functions of parameter setting, data collection, system control, data transmission, and alarm information. The parameter setting includes basic parameter setting of the testing compressor, test working condition parameter setting, and corresponding communication message setting. The system control includes manual control and automatic control, where the automatic control further includes automatic test condition control and automatic test process control. The data transmission is to transmit data collected by the PLC to the industrial control machine by means of the network switch.

The testing device for a service life of an air-conditioning compressor of a new energy vehicle is capable of automatically controlling the suction pressure and discharge pressure of the testing compressor. The testing device controls the electrical proportional valve to output appropriate pressure by means of the PLC so as to adjust opening degrees of the suction throttle valve and the discharge throttle valve, and controls the pulse number of the electronic expansion valve so as to accurately and stably control the suction pressure and discharge pressure.

The testing device for a service life of an air-conditioning compressor of a new energy vehicle may have functions of automatic charging and automatic refrigerant recovery according to different amounts of refrigerant under different working conditions. When a large amount of refrigerant is required under a test working condition, the charging valve is opened to add refrigerant from the recovery liquid storage tank into the main refrigeration cycle system. When a small amount of refrigerant is required under a test working condition, the recovery valve is opened to recover the refrigerant to the recovery liquid storage tank. In this way, waste of refrigerant may be reduced, carbon emissions are reduced, and carbon peaking and carbon neutrality goals are favorably achieved.

The testing device for a service life of an air-conditioning compressor of a new energy vehicle is capable of automatically controlling the environmental temperature and the suction temperature of the testing compressor. The environmental temperature is controlled by the environmental refrigeration subsystem and the electric heating pipe. The suction temperature is controlled by the air return tank. The air return tank is internally provided with the evaporation coil pipe and the electric heating pipe of the air return refrigeration subsystem. The testing device collects data of the environmental temperature and the suction temperature by means of a thermocouple module and compares the temperatures with a set temperature, and adjusts a proportion of electric heating according to a control algorithm so as to accurately and stably control the environmental temperature and the suction temperature. In order to avoid the situation that internal pressure of the air return tank is too high due to over-heating and then potential safety hazards are caused, a pressure protection switch is connected to the air return tank. When pressure in the tank reaches a set upper limit, a heating power supply is automatically cut off, a system test is finished, and fault information is displayed on the main interface of the measurement and control software.

Figure 1:
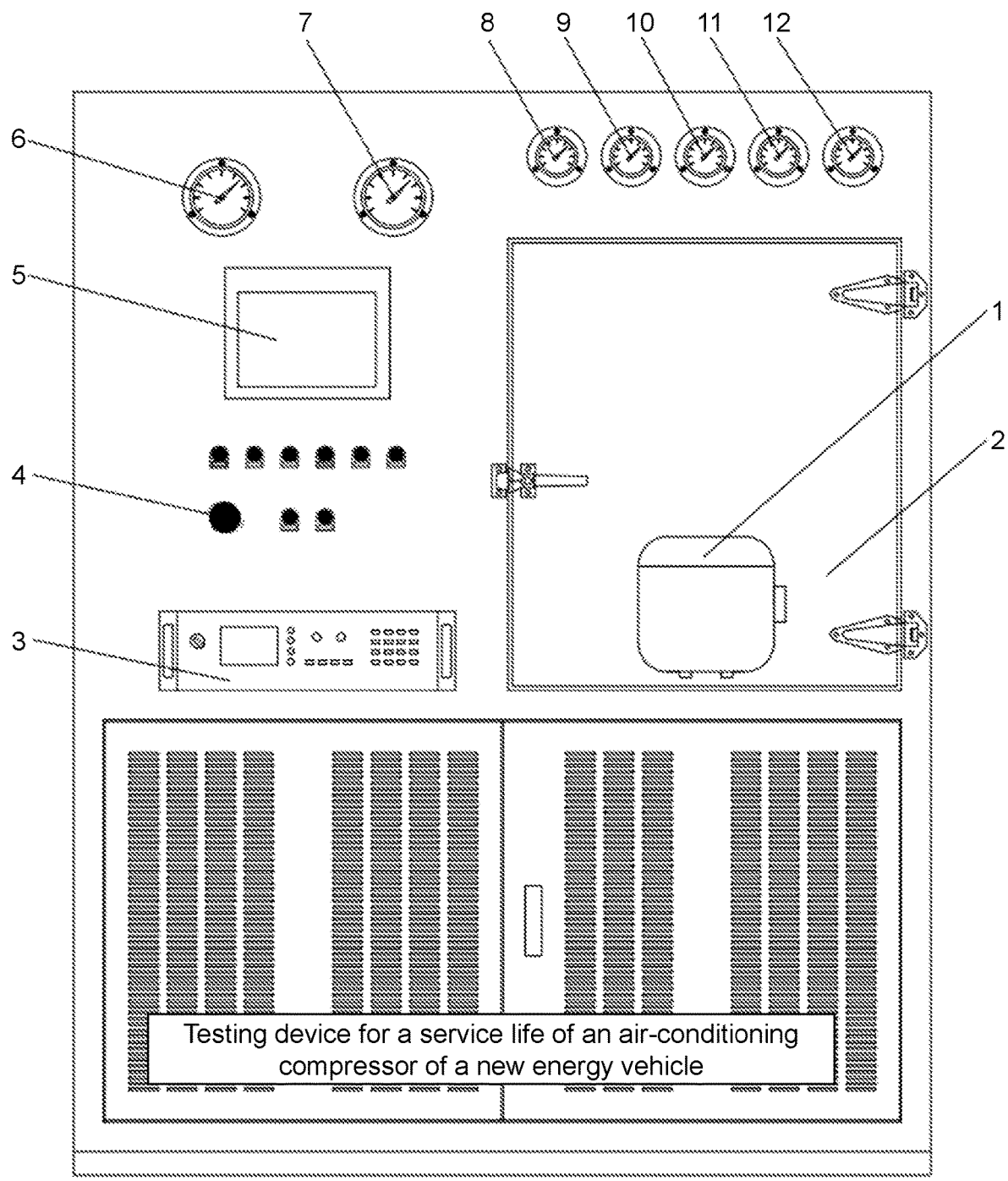
FIG. 1 is a schematic structural diagram of an appearance of a device of the present disclosure.

In the drawings: 1—testing compressor, 2—testing environment room, 3—direct-current power supply, 4—emergency stop switch, 5—touch screen, 6—suction pressure gauge, 7—discharge pressure gauge, 8—nitrogen pressure gauge, 9—environmental unit high pressure gauge, 10—environmental unit low pressure gauge, 11—air return unit high pressure gauge, 12—air return unit low pressure gauge, 13—recovery valve, 14—recovery compressor, 15—recovery subsystem condenser, 16—recovery liquid storage tank, 17—first electromagnetic valve, 18—first discharge throttle valve, 19—second discharge throttle valve, 20—third discharge throttle valve, 21—intermediate buffer coil pipe, 22—second electromagnetic valve, 23—first suction throttle valve, 24—second suction throttle valve, 25—electronic expansion valve, 26—air return tank, 27—air return refrigeration compressor, 28—air return unit condenser, 29—air return unit expansion valve, 30—air return tank electric heating pipe, 31—balance valve, 32—vacuum valve, 33—charging valve, 34—environmental refrigeration compressor, 35—environmental unit condenser, 36—environmental unit expansion valve, 37—environmental unit evaporator, 38—environmental temperature electric heating pipe, 39—programmable logic controller (PLC), 40—network switch, 41—industrial control machine, 42—PCAN-LIN module, 43—relay, 44—environmental circulating fan, 45—solid-state relay, 46—electronic expansion valve driver, 47—thermocouple input module, 48—suction temperature, 49—air return tank wall thermal temperature, 50—environmental unit air return temperature, 51—air return unit air return temperature, 52—environmental temperature, 53—discharge temperature, 54—shell temperature, 55—analog quantity input module, 56—suction pressure sensor, 57—discharge pressure sensor, 58—intermediate pressure sensor, 59—environmental unit low pressure sensor, 60—air return unit low pressure sensor, 61—recovery unit current sensor, 62—testing direct-current voltage sensor, 63—testing direct-current current sensor, 64—analog quantity input/output module, 65—environmental unit current sensor, 66—air return unit current sensor, 67—suction pneumatic pressure sensor, 68—discharge pneumatic pressure sensor, 69—suction pneumatic pressure electrical proportional valve, 70—discharge pneumatic pressure electrical proportional valve, 901-926—Steps.

DETAILED DESCRIPTION OF THE EMBODIMENTS

For making the objectives, technical solutions and advantages of the present disclosure clearer, the present disclosure will be further described in detail below in conjunction with the accompanying drawings of the description and specific examples. It should be understood that specific examples described herein are merely used to explain the present disclosure, and are not used to limit the present disclosure.

On the contrary, the present disclosure covers any alternatives, modifications, equivalent methods and solutions that are made within the spirit and scope of the present disclosure as defined by the claims. Furthermore, in order to make the public have a better understanding of the present disclosure, some specific details will be described in detail in the following detailed description of the present disclosure. For those skilled in the art, the present disclosure can be fully understood without the description of these details. The present disclosure is further described below in conjunction with the accompanying drawings of the description, and the scope of protection of the present disclosure is not limited to the following description.

FIG. 1 shows a schematic structural diagram of an appearance of a testing device for a service life of an air-conditioning compressor of a new energy vehicle in the example. The testing device is composed of an alternative refrigeration system, a measurement and control system, and a testing environment room 2. The testing device has an emergency stop switch 4, which is capable of cutting off a main power supply of the testing device in case of emergency failure during testing, thus playing a protective role. A touch screen 5 is an input/output device of the testing device, and plays a role of an man-machine interface. Parameters may be set on the touch screen 5, and a testing progress and a testing state may be known by means of the touch screen 5. The testing device is equipped with a direct-current power supply 3, a suction pressure gauge 6, a discharge pressure gauge 7, a nitrogen pressure gauge 8, an environmental unit high pressure gauge 9, an environmental unit low pressure gauge 10, an air return unit high pressure gauge 11, and an air return unit low pressure gauge 12. The above pressure may be visually displayed by means of the pressure gauges, such that whether there is any fault in a testing process may be determined.

Figure 2:
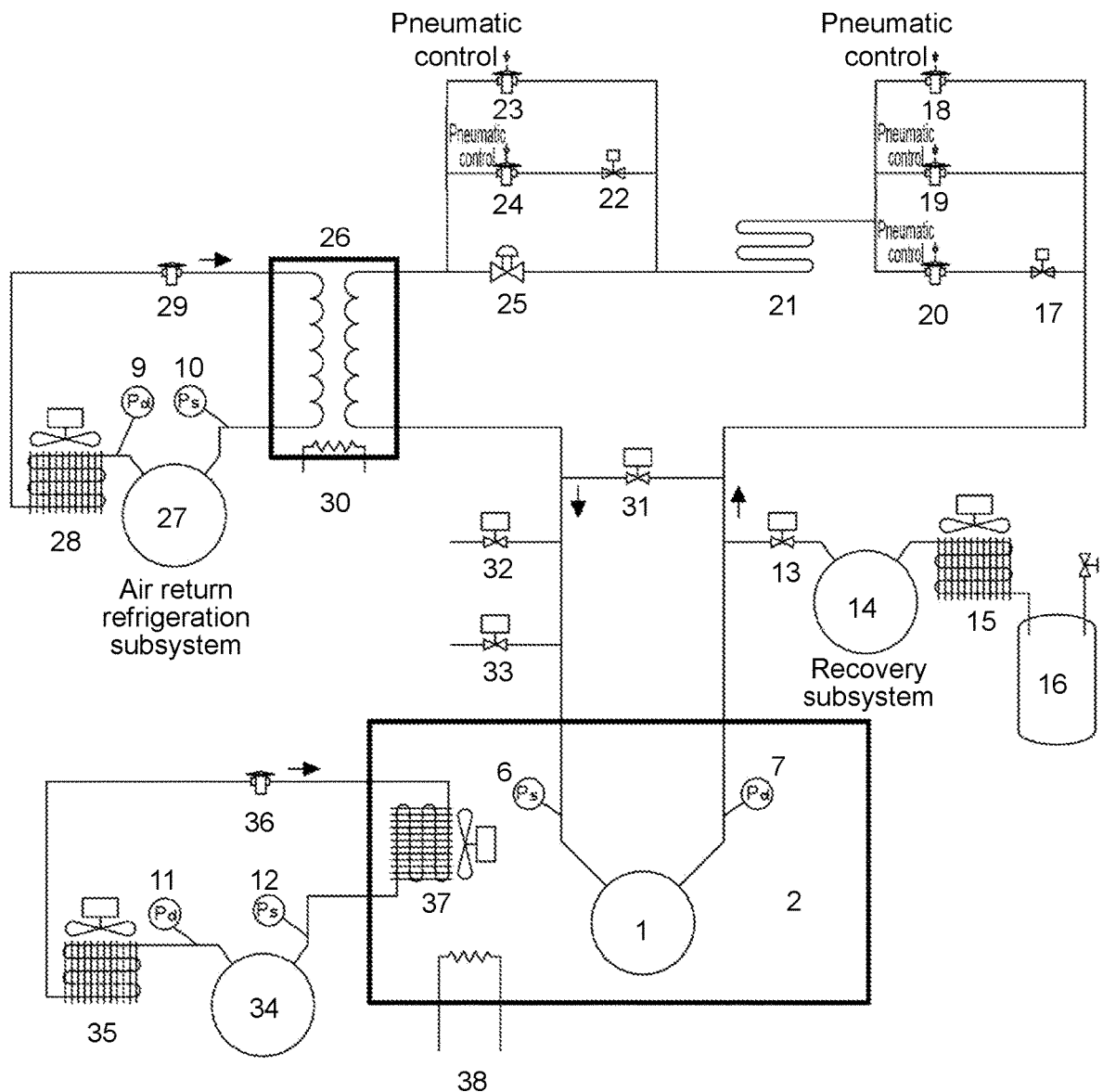
FIG. 2 is a schematic diagram of a testing principle of a device of the present disclosure.

FIG. 2 shows a schematic diagram of a testing principle of a testing device for a service life of an air-conditioning compressor of a new energy vehicle in the example. The testing device is composed of a main refrigeration cycle system, a recovery subsystem, an air return refrigeration subsystem, an environmental refrigeration subsystem, and an auxiliary part. The main refrigeration cycle system ensures that a testing compressor 1 runs under a set working condition, and a discharge end of the testing compressor 1 is connected to a discharge pressure gauge 7, such that discharge pressure may be displayed in real time. The discharge end of the testing compressor 1 is connected to three discharge throttle valves connected in parallel, where a front portion of a third discharge throttle valve 20 is connected to a first electromagnetic valve 17, and the first electromagnetic valve 17 is configured to control on and off of a pipeline where the third discharge throttle valve 20 is located. Rear portions of the three discharge throttle valves are connected to an intermediate buffer coil pipe 21, and a rear portion of the intermediate buffer coil pipe 21 is connected to a first suction throttle valve 23, a second suction throttle valve 24, and an electronic expansion valve 25 connected in parallel, where a front portion of the second suction throttle valve 24 is connected to a second electromagnetic valve 22, and the second electromagnetic valve 22 is configured to control on and off of a pipeline where the second suction throttle valve 24 is located. A rear portion of the suction throttle valve is connected to an air return tank 26, and the air return tank 26 is internally provided with an air return tank electric heating pipe 30 and an evaporation coil pipe, so as to control a suction temperature 48 of the testing compressor. An outlet of the air return tank 26 is connected to a suction end of the testing compressor 1. The suction end is connected to a suction pressure gauge 6, such that the suction pressure of the testing compressor 1 may be displayed in real time. The recovery subsystem is configured to recover refrigerant, and the recovery subsystem includes a recovery valve 13, a recovery compressor 14, a recovery subsystem condenser 15, and a recovery liquid storage tank 16. One end of the recovery valve 13 is connected to the discharge end of the testing compressor 1, the other end of the recovery valve is connected to a suction end of the recovery compressor 14, a discharge end of the recovery compressor 14 is connected to the recovery subsystem condenser 15, and a rear portion of the recovery subsystem condenser 15 is connected to the recovery liquid storage tank 16 configured to store recovered refrigerant. The air return refrigeration subsystem includes an air return refrigeration compressor 27, an air return unit condenser 28, an air return unit expansion valve 29, and an evaporation coil pipe, and pressure gauges are connected to a discharge end and a suction end of the air return refrigeration compressor, such that high pressure and low pressure of an air return unit may be displayed in real time. The environmental refrigeration subsystem includes an environmental refrigeration compressor 34, an environmental unit condenser 35, an environmental unit expansion valve 36, and an environmental unit evaporator 37, and pressure gauges are connected to a suction end and a discharge end of the environmental refrigeration compressor, such that high pressure and low pressure of an environmental unit may be displayed in real time. The auxiliary part includes a balance valve 31, a vacuum valve 32, and a charging valve 33. One end of the balance valve 31 is connected to the suction end of the testing compressor 1, the other end of the balance valve is connected to the discharge end of the testing compressor 1, and the balance valve 31 is opened to facilitate turning-on of the testing compressor 1. One end of the vacuum valve 32 is connected to the main refrigeration cycle system, the other end of the vacuum valve is connected to a vacuum pump, and the vacuum valve 32 is opened such that the vacuum pump vacuumizes the main refrigeration cycle system. One end of the charging valve 33 is connected to the suction end of the testing compressor 1, the other end of the charging valve is connected to the recovery liquid storage tank 16, and the charging valve 33 is opened such that refrigerant is added into the main refrigeration cycle system.

Figure 3:
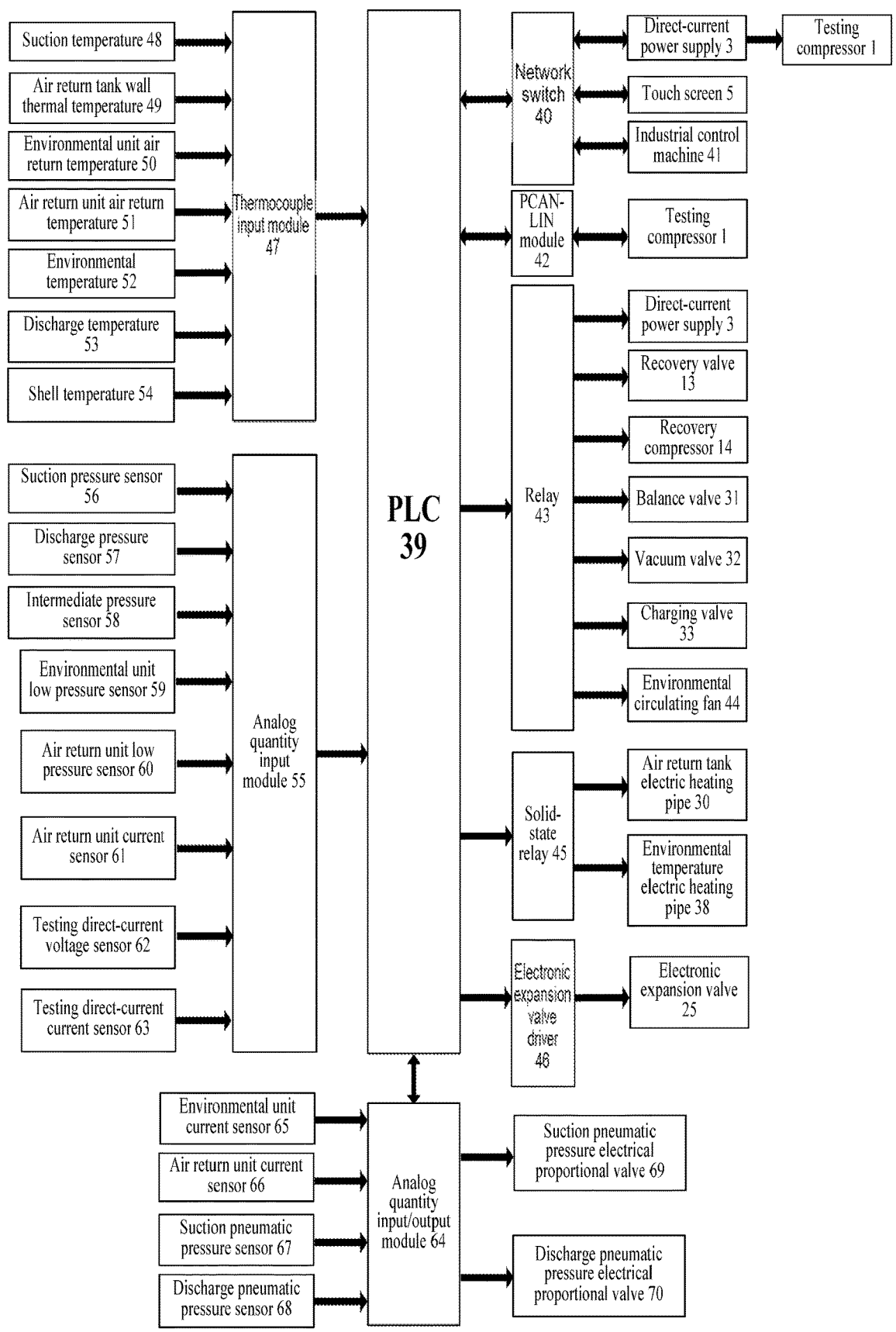
FIG. 3 is a block diagram of hardware of a control system of a device of the present disclosure.

FIG. 3 shows a block diagram of hardware of a control system of a testing device for a service life of an air-conditioning compressor of a new energy vehicle in the example. A measurement and control system takes a programmable logic controller (PLC) 39 as a control core, so as to achieve data measurement and system control of the whole testing device.

Specifically, the PLC 39 is in communication with a direct-current power supply 3, a touch screen 5, and an industrial control machine 41 by means of a network switch 40. The direct-current power supply 3 provides required direct-current working voltage for a testing compressor 1, and the touch screen 5 is an input/output device of the testing device, such that man-machine conversation is achieved. Data collected in a testing process is transmitted to the industrial control machine 41 by means of the network switch 40 for storage.

Specifically, the PLC 39 is connected to a peak controller area network (PCAN)-local interconnect network (LIN) module 42 so as to be in communication with the testing compressor 1, the testing device transmits an instruction to the PCAN-LIN module 42 by means of an RS232 port extended from the PLC 39, and the PCAN-LIN module 42 transmits the instruction to a driver of the testing compressor 1 so as to control the testing compressor 1 to be turned on or off, and control a rotation speed. The PLC 39 transmits data fed back by the testing compressor 1 to the industrial control machine 41 by means of the network switch 40, and operation information of the testing compressor 1 may be known according to the data fed back by the testing compressor 1.

Specifically, the PLC 39 is connected to a relay 43, so as to control switching-on or switching-off of the direct-current power supply 3, a recovery valve 13, a recovery compressor 14, a balance valve 31, a vacuum valve 32, a charging valve 33, and an environmental circulating fan 44.

Specifically, the PLC 39 is connected to a solid-state relay 45 so as to control on and off of an air return tank electric heating pipe 30 and an environmental temperature electric heating pipe 38.

Specifically, the PLC 39 controls forward and reverse rotation of an electronic expansion valve driver 46 so as to control a pulse number of an electronic expansion valve 25.

Specifically, the PLC 39 is connected to a thermocouple input module 47 so as to collect data of a suction temperature 48, an air return tank wall thermal temperature 49, an environmental unit air return temperature 50, an air return unit air return temperature 51, an environmental temperature 52, a discharge temperature 53, and a shell temperature 54.

Specifically, the PLC 39 is connected to a suction pressure sensor 56, a discharge pressure sensor 57, an intermediate pressure sensor 58, an environmental unit low pressure sensor 59, an air return unit low pressure sensor 60, a recovery unit current sensor 61, a testing direct-current voltage sensor 62, and a testing direct-current current sensor 63 by means of an analog quantity input module 55, so as to measure pressure, current and voltage.

Specifically, the PLC 39 is connected to an environmental unit current sensor 65, an air return unit current sensor 66, a suction pneumatic pressure sensor 67, and a discharge pneumatic pressure sensor 68 by means of an extended analog quantity input/output module 64, so as to measure current and pressure and control output pressure of a suction pneumatic pressure electrical proportional valve 69 and a discharge pneumatic pressure electrical proportional valve 70.

Figure 4:
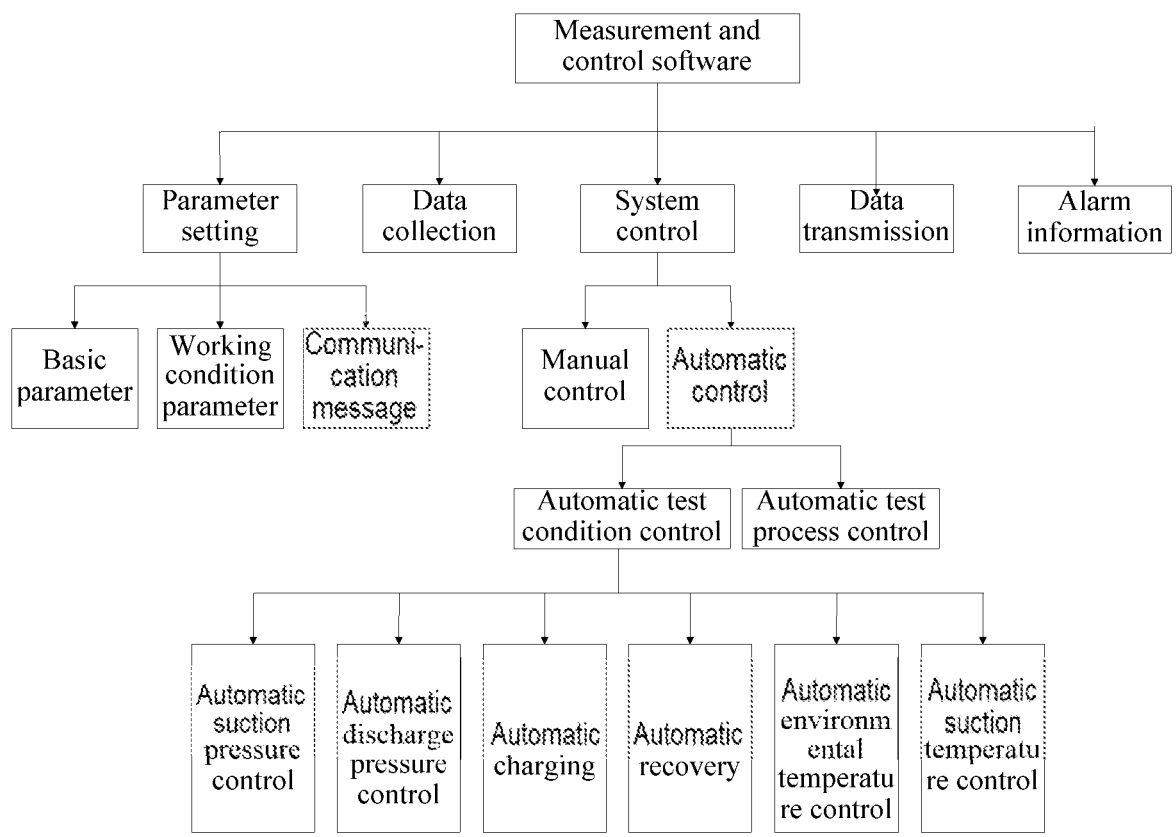
FIG. 4 is a functional diagram of measurement and control software of a device of the present disclosure.

FIG. 4 shows a functional diagram of measurement and control software of a testing device for a service life of an air-conditioning compressor of a new energy vehicle in the example. The measurement and control software has functions of parameter setting, data collection, system control, data transmission, and alarm information. The parameter setting includes basic parameter setting, test working condition parameter setting, and corresponding communication message setting, where the basic parameter setting includes selection of a model of a testing compressor 1, selection of a communication mode of the testing compressor 1, selection of a refrigerant type, and setting of rated voltage. The test working condition parameter setting includes setting of suction pressure 6, discharge pressure 7, a suction temperature 48, an environmental temperature 52, testing voltage, testing time, and a rotation speed. The system control includes manual control and automatic control, and the automatic control further includes automatic test condition control and automatic test process control, where the automatic test condition control includes functions such as automatic suction pressure control, automatic discharge pressure control, automatic charging, automatic recovery, automatic environmental temperature control, and automatic suction temperature control. The data transmission is to transmit data collected by the PLC 39 to an industrial control machine 41 by means of a network switch 40.

Figure 5A:
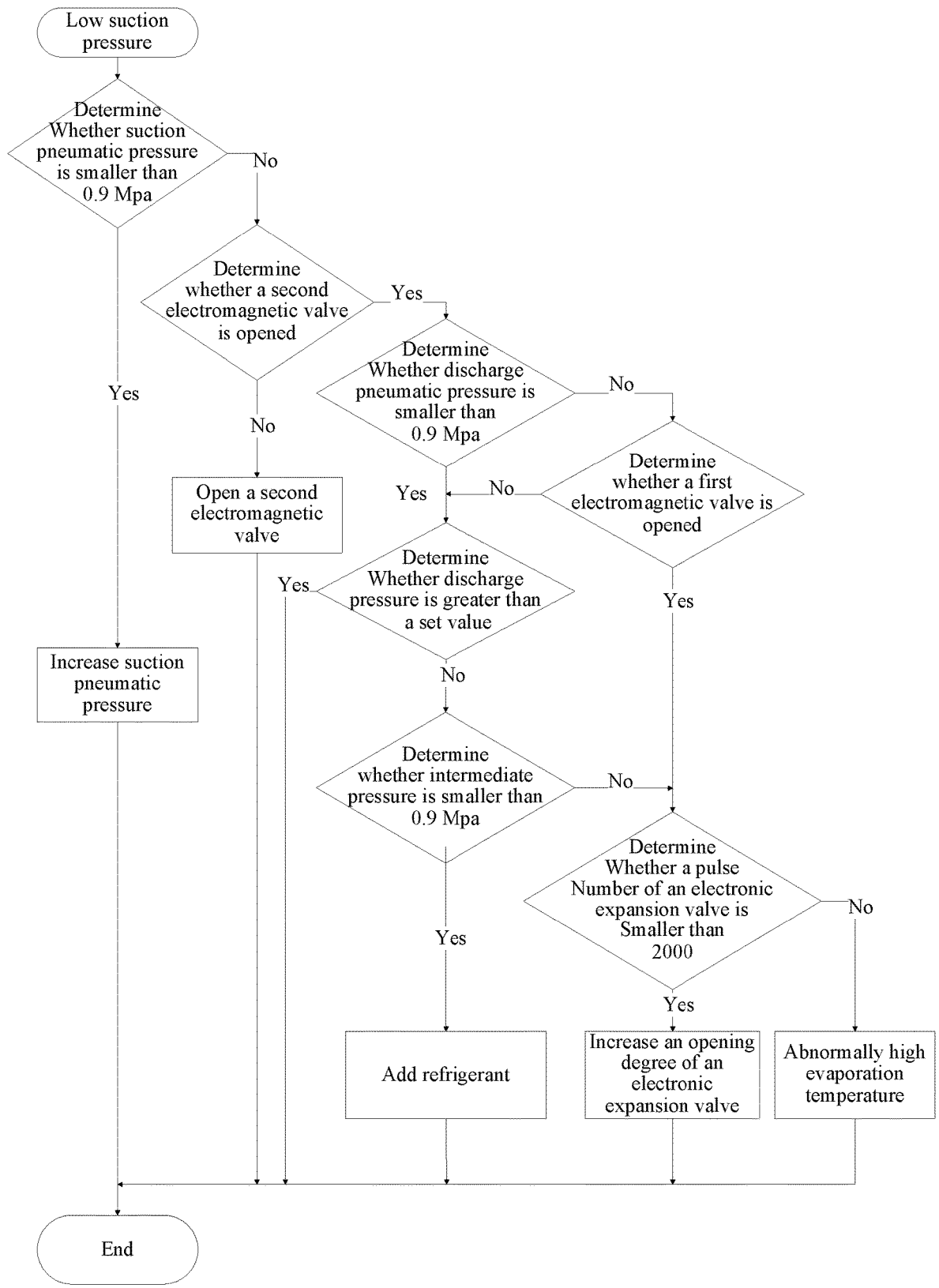
FIG. 5A is a control flow diagram with low suction pressure of a device of the present disclosure.
Figure 5B:
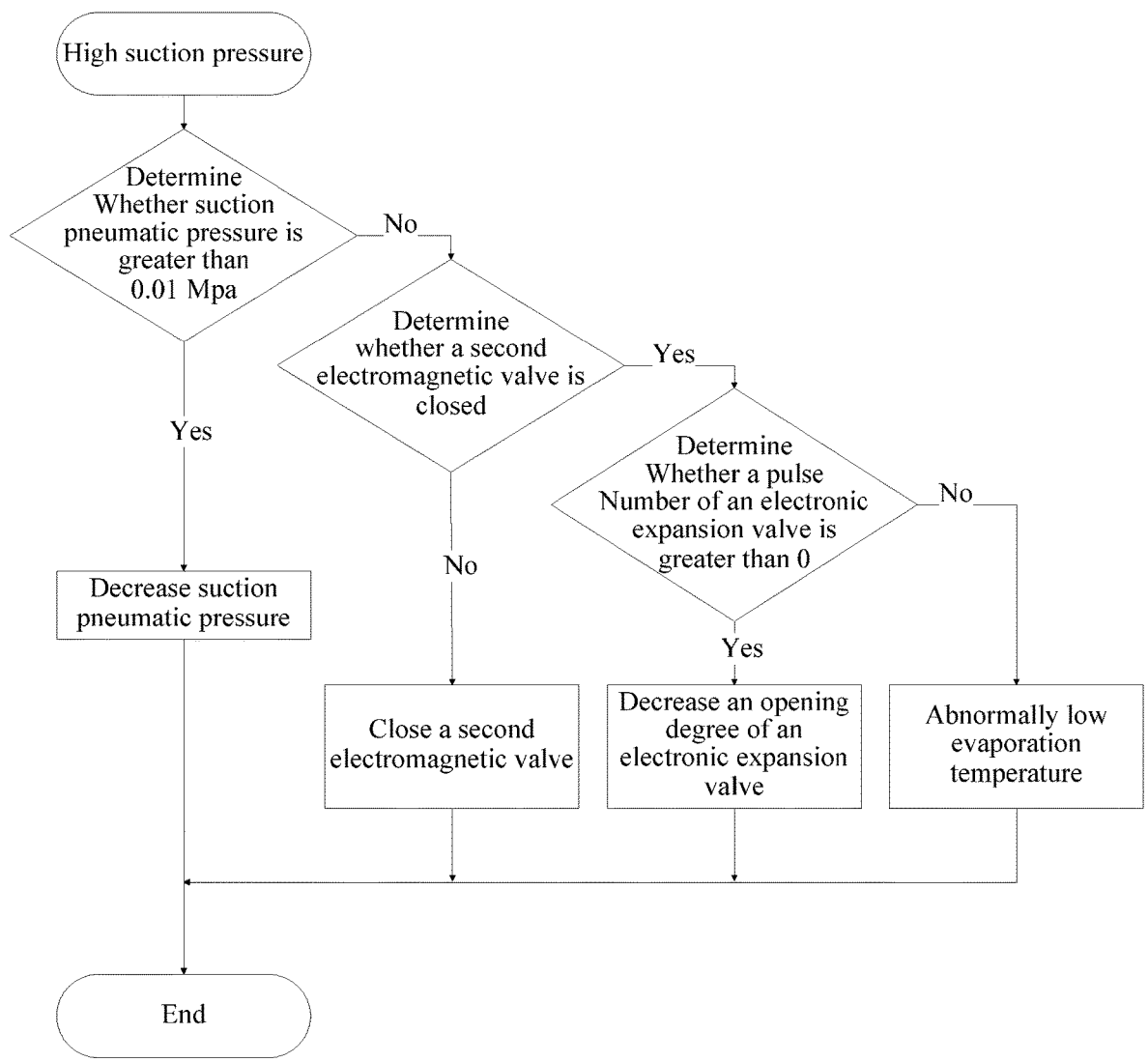
FIG. 5B is a control flow diagram with high suction pressure of a device of the present disclosure.

FIG. 5A shows a control flow diagram of low suction pressure 6 of a testing device for a service life of an air-conditioning compressor of a new energy vehicle in the example. FIG. 5B shows a control flow diagram of high suction pressure 6 of a testing device for a service life of an air-conditioning compressor of a new energy vehicle in the example.

When the suction pressure 6 is low, step one, whether suction pneumatic pressure is smaller than a maximum value 0.9 Mpa output from a suction pneumatic pressure electrical proportional valve 69 is determined, and under the condition that the suction pneumatic pressure is smaller than 0.9 Mpa, the suction pneumatic pressure is increased; under the condition that the suction pneumatic pressure is not smaller than 0.9 Mpa, step two, whether a second electromagnetic valve 22 is opened is determined, and under the condition the second electromagnetic valve is not opened, the second electromagnetic valve 22 is opened; under the condition that the second electromagnetic valve is opened, step three, whether discharge pneumatic pressure is smaller than a maximum value 0.9 Mpa output from a discharge pneumatic pressure electrical proportional valve 70 is determined, under the condition that the discharge pneumatic pressure is smaller than 0.9 Mpa or equal to 0.9 Mpa, and a first electromagnetic valve 17 is closed, step four, whether discharge pressure 7 is greater than set discharge pressure is determined, and under the condition that the discharge pressure is greater than a set value, no operations are conducted; under the condition that the discharge pressure is not greater than the set value, step five, whether intermediate pressure is smaller than 0.9 Mpa is determined, and under the condition that the intermediate pressure is smaller than 0.9 Mpa, it is indicated that there is not enough refrigerant in the main refrigeration cycle system and a charging valve 33 needs to be opened to add refrigerant into the main refrigeration cycle system; under the condition that the intermediate pressure is equal to 0.9 Mpa, step six, whether a pulse number of an electronic expansion valve 25 is smaller than 2000 is determined, and under the condition that the pulse number is smaller than 2000, an opening degree of the electronic expansion valve 25 is increased; under the condition that the pulse number is not smaller than 2000, it is indicated that an evaporation temperature is too high and an alarm is given since the evaporation temperature is too high; under the condition that the discharge pneumatic pressure reaches the maximum value 0.9 Mpa output from the discharge pneumatic pressure electrical proportional valve 70 and the first electromagnetic valve 17 is opened, step seven, whether the pulse number of the electronic expansion valve 25 is smaller than 2000 is determined, and under the condition that the pulse number is smaller than 2000, the opening degree of the electronic expansion valve 25 is increased; and under the condition that the pulse number is not smaller than 2000, it is indicated that the evaporation temperature is too high and an alarm is given since the evaporation temperature is too high; and alternatively, when the suction pressure 6 is high, step one, whether suction pneumatic pressure is greater than a minimum value 0.01 Mpa output from a suction pneumatic pressure electrical proportional valve 69 is determined, and under the condition that the suction pneumatic pressure is greater than 0.01 Mpa, the suction pneumatic pressure is decreased; under the condition that the suction pneumatic pressure is not greater than 0.01 Mpa, step two, whether a second electromagnetic valve is closed is determined, and under the condition that the second electromagnetic valve is not closed, the second electromagnetic valve 22 is closed; under the condition that the second electromagnetic valve is closed, step three, whether a pulse number of an electronic expansion valve 25 is greater than 0 is determined, and under the condition that the pulse number is greater than 0, an opening degree of the electronic expansion valve 25 is decreased; and under the condition that the pulse number is not greater than 0, it is indicated that an evaporation temperature is too low and an alarm is given since the evaporation temperature is too low.

Figure 6A:
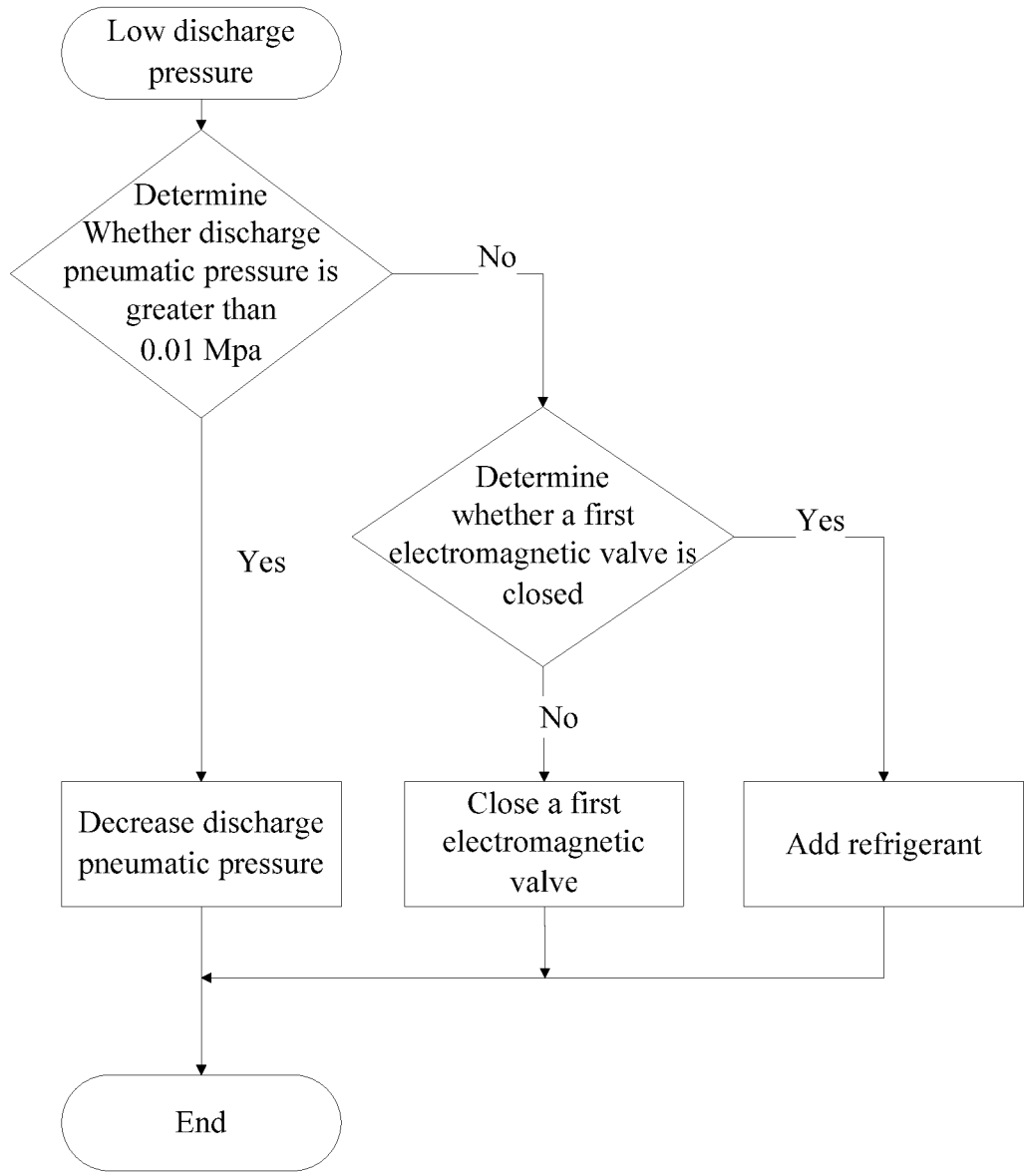
FIG. 6A is a control flow diagram with low discharge pressure of a device of the present disclosure.
Figure 6B:
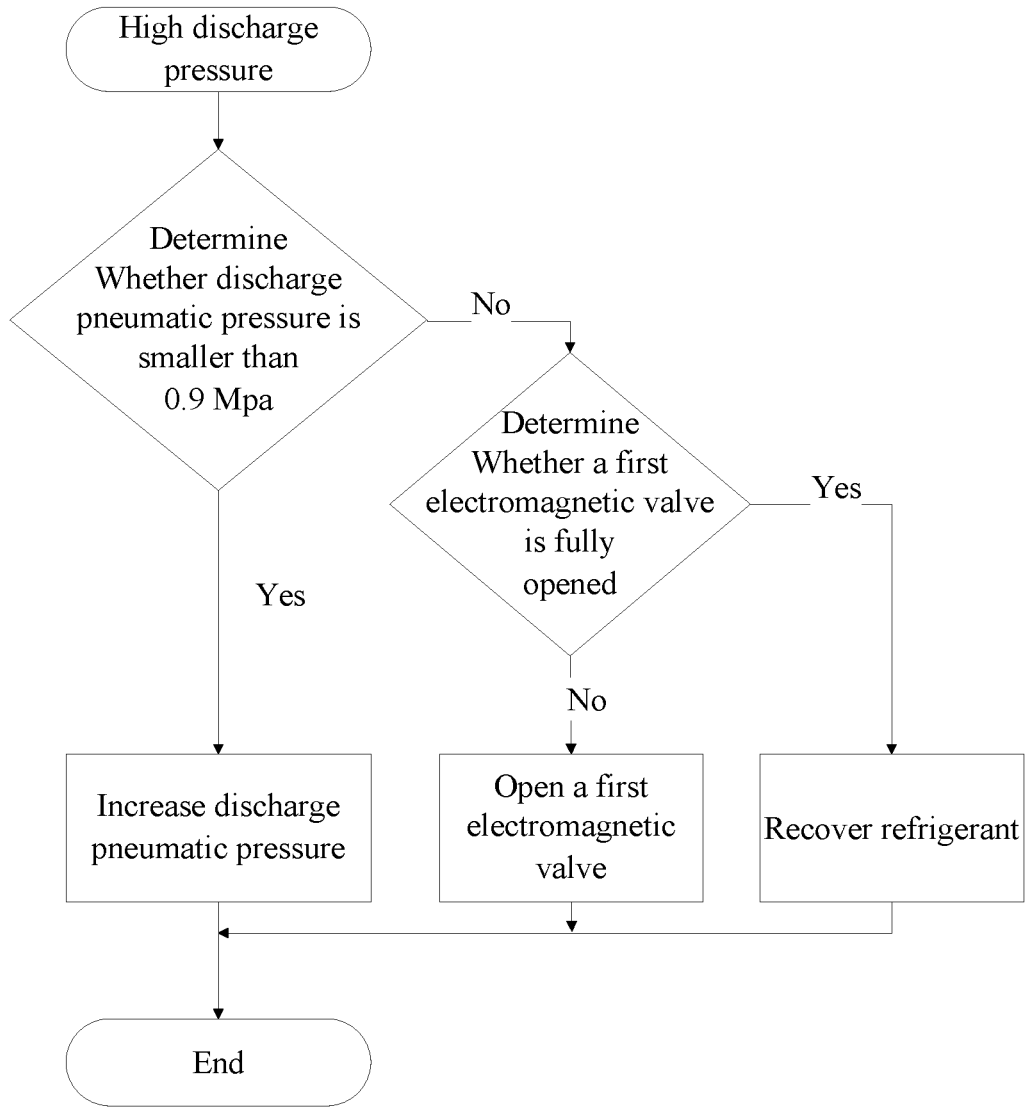
FIG. 6B is a control flow diagram with high discharge pressure of a device of the present disclosure.

FIG. 6A shows a control flow diagram of low discharge pressure 7 of a testing device for a service life of an air-conditioning compressor of a new energy vehicle in the example. FIG. 6B shows a control flow diagram of high discharge pressure 7 of a testing device for a service life of an air-conditioning compressor of a new energy vehicle in the example.

When the discharge pressure 7 is low, step one, whether discharge pneumatic pressure is greater than a minimum value 0.01 Mpa output from a discharge pneumatic pressure electrical proportional valve 70 is determined, and under the condition that the discharge pneumatic pressure is greater than 0.01 Mpa, the discharge pneumatic pressure is decreased; under the condition that the discharge pneumatic pressure is not greater than 0.01 Mpa, step two, whether a first electromagnetic valve 17 is closed is determined, and under the condition that the first electromagnetic valve is not closed, the first electromagnetic valve 17 is closed; and under the condition that the first electromagnetic valve is closed, it is indicated that there is not enough refrigerant in the main refrigeration cycle system and a charging valve 33 needs to be opened to add refrigerant into the main refrigeration cycle system; and alternatively, when the discharge pressure 7 is high, step one, whether discharge pneumatic pressure is smaller than a maximum value 0.9 Mpa output from a discharge pneumatic pressure electrical proportional valve 70 is determined, and under the condition that the discharge pneumatic pressure is smaller than 0.9 Mpa, the discharge pneumatic pressure is increased; under the condition that the discharge pneumatic pressure is not smaller than 0.9 Mpa, step two, whether a first electromagnetic valve 17 is opened is determined, and under the condition that the first electromagnetic valve is not opened, the first electromagnetic valve 17 is opened; and under the condition that the first electromagnetic valve is opened, it is indicated that there is too much refrigerant in the main refrigeration cycle system and a recovery valve 13 needs to be opened to recover refrigerant.

Figure 7:
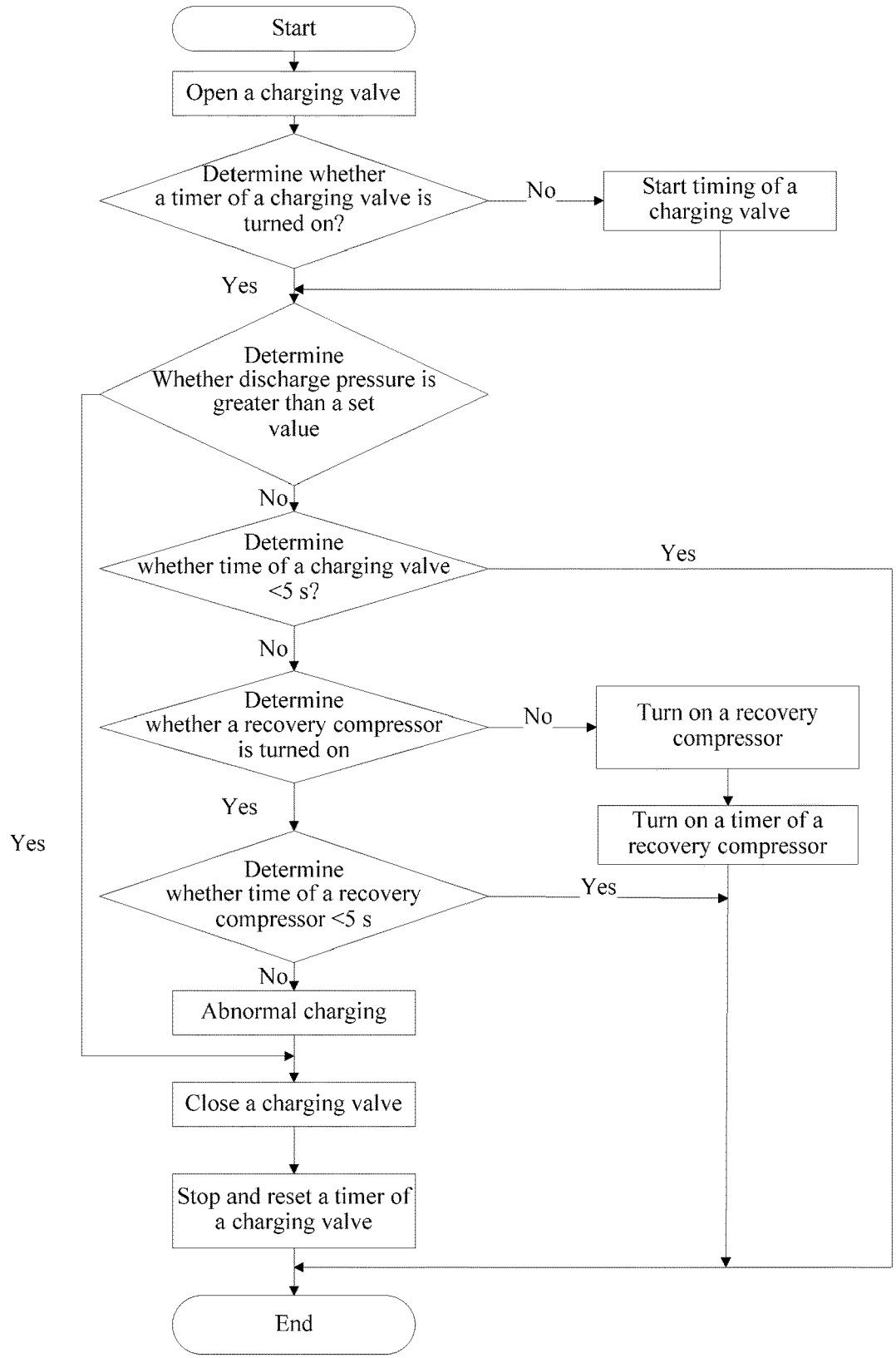
FIG. 7 is a control flow diagram of automatic charging of a device of the present disclosure.

FIG. 7 shows a control flow diagram of automatic charging of a testing device for a service life of an air-conditioning compressor of a new energy vehicle in the example.

During automatic charging, step one, a charging valve 33 is opened; step two, whether a timer of the charging valve is turned on is determined, and under the condition that the timer of the charging valve is not turned on, the timer of the charging valve is turned on; step three, whether discharge pressure 7 is greater than set discharge pressure is determined, and under the condition that the discharge pressure 7 is greater than a set value, the charging valve 33 is closed, and the timer of the charging valve is stopped and reset; under the condition that the discharge pressure is not greater than a set value, step four, whether the timer of the charging valve is smaller than 5 s is determined, and under the condition that the timer of the charging valve is smaller than 5 s, timing is continued; under the condition that the timer of the charging valve is not smaller than 5 s, step five, whether a recovery compressor 14 is turned on is determined, under the condition that the recovery compressor is not turned on, the recovery compressor 14 is turned on, and a timer of the recovery compressor is turned on; under the condition that the recovery compressor 14 is turned on, step six, whether the timer of the recovery compressor is smaller than 5 s is determined, and under the condition that the timer of the recovery compressor is smaller than 5 s, the recovery compressor 14 is continuously turned on; and under the condition that the timer of the recovery compressor is not smaller than 5 s, it is indicated that charging is abnormal and the charging valve 33 needs to be closed, the timer of the charging valve is stopped and reset, and abnormal charging information is displayed on a main interface of measurement and control software.

Figure 8:
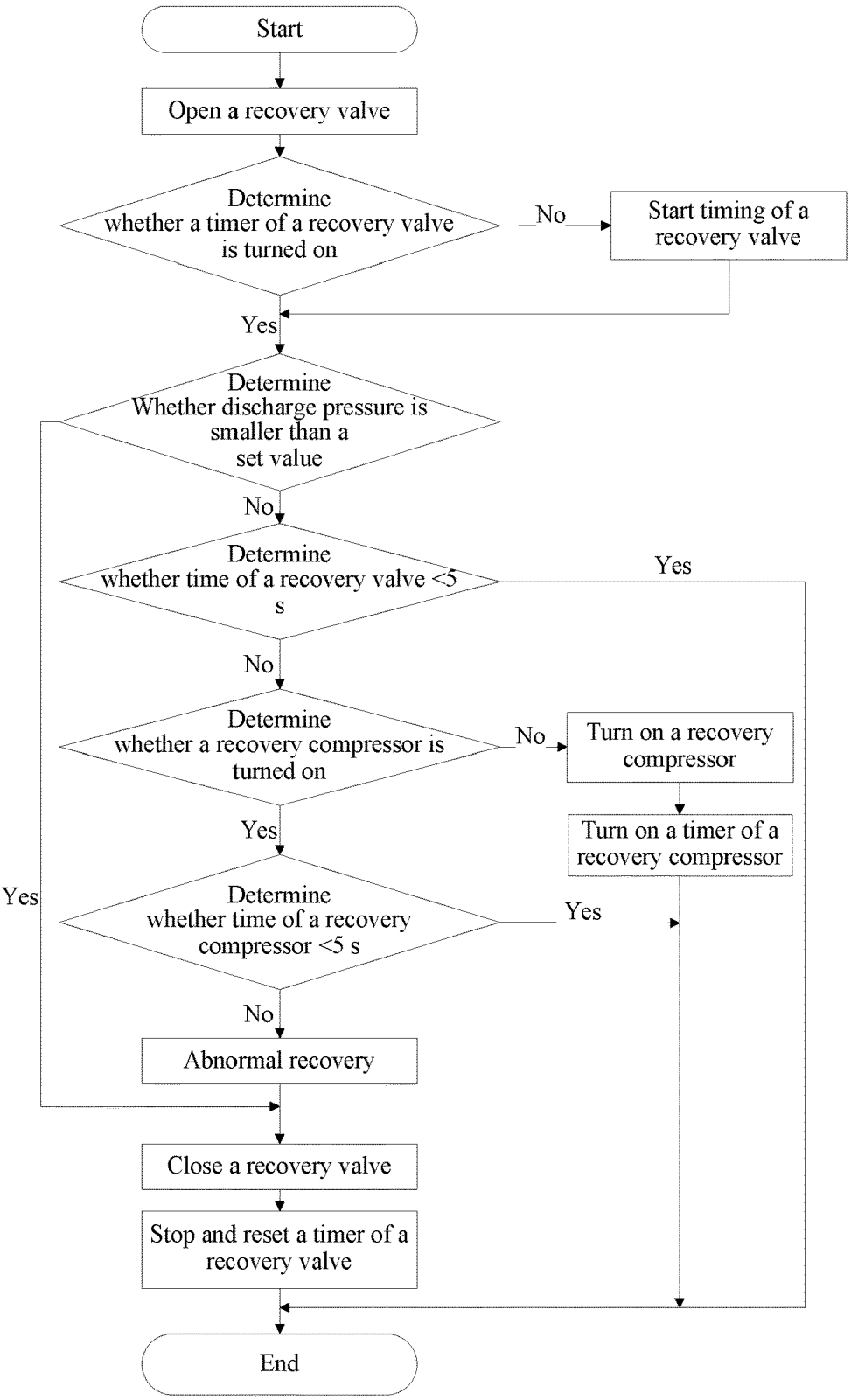
FIG. 8 is a control flow diagram of automatic recovery of a device of the present disclosure.

FIG. 8 shows a control flow diagram of automatic recovery of a testing device for a service life of an air-conditioning compressor of a new energy vehicle in the example.

During automatic recovery, step one, a recovery valve 13 is opened; step two, whether a timer of the recovery valve is turned on is determined, and under the condition that the timer of the recovery valve is not turned on, the timer of the recovery valve is turned on; step three, whether discharge pressure 7 is smaller than set discharge pressure is determined, and under the condition that the discharge pressure 7 is smaller than a set value, the recovery valve 13 is closed, and the timer of the recovery valve is stopped and reset; under the condition that the discharge pressure is not smaller than a set value, step four, whether the timer of the recovery valve is smaller than 5 s is determined, and under the condition that the timer of the recovery valve is smaller than 5 s, timing is continued; under the condition that the timer of the recovery valve is not smaller than 5 s, step five, whether a recovery compressor 14 is turned on is determined, under the condition that the recovery compressor is not turned on, the recovery compressor 14 is turned on, and a timer of the recovery compressor is turned on; under the condition that the recovery compressor 14 is turned on, step six, whether the timer of the recovery compressor is smaller than 5 s is determined, and under the condition that the timer of the recovery compressor is smaller than 5 s, the recovery compressor 14 is continuously turned on; and under the condition that the timer of the recovery compressor is not smaller than 5 s, it is indicated that recovery is abnormal and the recovery valve 13 needs to be closed, the timer of the recovery valve is stopped and reset, and abnormal recovery information is displayed on a main interface of measurement and control software.

Figure 9:
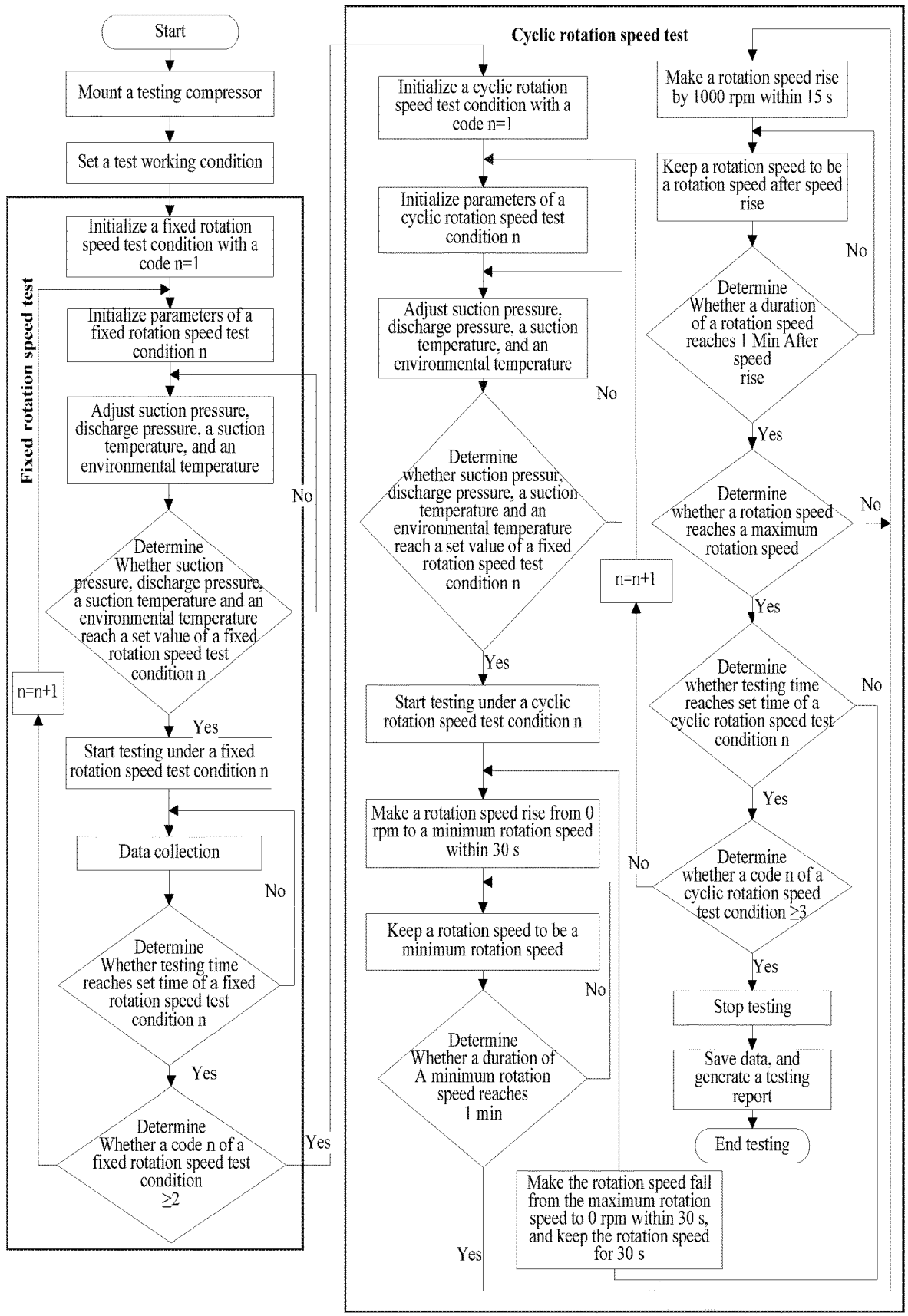
FIG. 9 is a flow diagram of testing of a device of the present disclosure.

Test conditions of the testing device for a service life of an air-conditioning compressor of a new energy vehicle in the example are divided into two stages. A first stage is a fixed rotation speed test condition including two test conditions: fixed rotation speed test condition 1 and fixed rotation speed test condition 2; and a second stage is a cyclic rotation speed test condition including three test conditions: cyclic rotation speed test condition 1, cyclic rotation speed test condition 2, and cyclic rotation speed test condition 3. FIG. 9 shows a testing process of a testing device for a service life of an air-conditioning compressor of a new energy vehicle in the example, which specifically includes the following steps:

(1) A testing compressor 1 is mounted: the testing compressor 1 is mounted in a testing environment room 2, and a suction end and a discharge end of the testing compressor are connected to a main refrigeration cycle system.
(2) Test working condition parameters are set: a parameter setting interface is opened on a touch screen 5, basic parameters and test working condition parameters of the testing compressor 1 are set, and corresponding communication messages are input.
(3) A fixed rotation speed test stage is entered: the fixed rotation speed test condition is initialized with a code n=1.
(4) Parameters of the fixed rotation speed test condition n are initialized.
(5) Suction pressure 6, discharge pressure 7, a suction temperature 48 and an environmental temperature 52 are adjusted.
(6) Whether the suction pressure 6, the discharge pressure 7, the suction temperature 48 and the environmental temperature 52 reach a set value of the fixed rotation speed test condition n are determined; if not, step 5 is returned to, so as to continue adjustment; and if yes, the next step is proceeded to.
(7) Testing is started under the fixed rotation speed test condition n.
(8) Data is collected: the testing device samples various required data at a high speed.
(9) Whether testing time reaches set time of the fixed rotation speed test condition n is determined; if not, step 8 is returned to, so as to continue data collection; and if yes, the next step is proceeded to.
(10) Whether testing under the fixed rotation speed test condition is completed is determined; if not, 1 is added to a code of the fixed rotation speed test condition, and then step 4 is returned to, so as to start new testing under the fixed rotation speed test condition; and if yes, a cyclic rotation speed test is entered.
(11) A cyclic rotation speed test stage is entered: the cyclic rotation speed test condition is initialized with a code n=1.
(12) Parameters of the cyclic rotation speed test condition n are initialized.
(13) The suction pressure 6, the discharge pressure 7, the suction temperature 48 and the environmental temperature 52 are adjusted.
(14) Whether the suction pressure 6, the discharge pressure 7, the suction temperature 48 and the environmental temperature 52 reach a set value of the cyclic rotation speed test condition n is determined; if not, step 13 is returned to, so as to continue adjustment; and if yes, the next step is proceeded to.
(15) Testing is started under the cyclic rotation speed test condition n.
(16) A rotation speed is made rise from 0 rpm to a minimum rotation speed within 30 s.
(17) The rotation speed is kept to be the minimum rotation speed.
(18) Whether a duration of the minimum rotation speed reaches 1 min is determined; if not, step 17 is returned to; and if yes, the next step is proceeded to.
(19) The rotation speed is made rise by 1000 rpm within 15 s.
(20) The rotation speed is kept to be a rotation speed after speed rise.
(21) Whether a duration of the rotation speed reaches 1 min after speed rise is determined; if not, step 20 is returned to; and if yes, the next step is proceeded to.
(22) Whether the rotation speed reaches a maximum rotation speed is determined; if not, step 19 is returned to, so as to continue to make the rotation speed rise; and if yes, the next step is proceeded to.
(23) Whether set time of the cyclic rotation speed test condition n is reached is determined; if not, the rotation speed is made fall from the maximum rotation speed to 0 rpm within 30 s, the rotation speed is kept for 30 s, and step 16 is returned to, so as to continue testing; and if yes, the next step is proceeded to.
(24) Whether testing under the cyclic rotation speed test condition is completed is determined; if not, 1 is added to a code of the cyclic rotation speed test condition, and then step 12 is returned to, so as to start new testing under the cyclic rotation speed test condition; and if yes, the next step is proceeded to.
(25) Testing is stopped.
(26) Data is saved and a report is generated: testing data is saved in an industrial control machine 39 by means of a network switch 38, and a testing report is automatically generated.

The adjustment of relevant process parameters in the process should be conducted according to the national standard GB/T 22068-2018 electric compressor assembly for vehicle air-conditioning. After a life test of the compressor is completed by the device of the present disclosure, whether the service life of the compressor is qualified is determined according to the relevant parameters specified in section 5.8 mentioned above.

Through the above technologies, compared with the prior art, the present disclosure has the beneficial effects as follows:

(1) The main refrigeration cycle system of the testing device of the present disclosure runs with pure gas, since there is no phase change, a heat exchange amount is small, a small refrigeration system may be used to test a compressor having high cooling capacity, and is suitable for compressors of 500 W-10 kW, and the system requires a small amount of refrigerant.
(2) The suction pressure and discharge pressure of the testing device of the present disclosure are controlled by controlling the opening degrees of the suction throttle valve and the discharge throttle valve, and controlling the pulse number of the electronic expansion valve, such that rapid adjustment of working conditions may be achieved.
(3) The testing device of the present disclosure may have functions of automatic charging and automatic refrigerant recovery according to different amounts of refrigerant under different working conditions, such that waste of refrigerant may be reduced, carbon emissions are reduced, and carbon peaking and carbon neutrality goals are favorably achieved.
(4) The testing device of the present disclosure may be compatible with compressors having different drivers, and may be suitable for compressors having various communication speed regulation modes such as a controller area network (CAN), LIN, and pulse-width modulation (PWM).

The measurement and control system takes a programmable logic controller (PLC) as a control core, so as to achieve data measurement and system control of the testing device. The testing environment room has a heating system and a low-temperature refrigeration unit, such that temperature control of the testing environment room can be achieved. The testing device can be compatible with compressors with different types of drivers.

In conclusion, the main refrigeration cycle system of the present disclosure runs with pure gas, gas of the testing compressor is discharged via the discharge throttle valve, and then enters the suction end via the suction throttle valve and the electronic expansion valve, and since there is no phase change, the heat exchange amount is small; adjustable ranges of the discharge throttle valve, the suction throttle valve and the electronic expansion valve are wide; and based on the system structure, a small refrigeration system may be used to test a compressor having high cooling capacity, and is suitable for compressors of 500 W-10 kW, and the system may quickly achieve a target working condition with a small amount of refrigerant. The measurement and control system takes the PLC as a control core, so as to achieve data measurement and system control of the testing device. The testing environment room has a heating system and a low-temperature refrigeration unit, such that arbitrary temperature control of the testing environment room may be achieved in a range of −30° C.-120° C. The testing device may be compatible with compressors having different drivers, and may be suitable for compressors having various communication speed regulation modes such as a controller area network (CAN), LIN, and pulse-width modulation (PWM).

What is claimed is:

1. A testing device for a service life of an air-conditioning compressor of a new energy vehicle running with pure gas, comprising: an alternative refrigeration system configured to ensure an operation condition of a specific working condition of a compressor test; a measurement and control system that takes a programmable logic controller (PLC) as a control core, so as to achieve data measurement and system control of the whole testing device; and a testing environment room configured to provide an environmental temperature required for the compressor test, wherein the alternative refrigeration system comprises a main refrigeration cycle system, a recovery subsystem, an air return refrigeration subsystem, an environmental refrigeration subsystem, and an auxiliary part; the main refrigeration cycle system ensures that a testing compressor runs in a set working condition, and comprises the testing compressor, a first electromagnetic valve, a first discharge throttle valve, a second discharge throttle valve, a third discharge throttle valve, an intermediate buffer coil pipe, a second electromagnetic valve, a first suction throttle valve, a second suction throttle valve, an electronic expansion valve, and an air return tank; the air return tank is internally provided with an evaporation coil pipe and an air return tank electric heating pipe; the recovery subsystem is configured to recover refrigerant and comprises a recovery valve, a recovery compressor, a recovery subsystem condenser, and a recovery liquid storage tank, and the recovery liquid storage tank is configured to store refrigerant; the air return refrigeration subsystem and the air return tank electric heating pipe control a suction temperature, and the air return refrigeration subsystem comprises an air return refrigeration compressor, an air return unit condenser, an air return unit expansion valve, and the evaporation coil pipe; the environmental refrigeration subsystem and an environmental temperature electric heating pipe control the environmental temperature of the testing compressor, and the environmental refrigeration subsystem comprises an environmental refrigeration compressor, an environmental unit condenser, an environmental unit expansion valve, and an environmental unit evaporator; and the auxiliary part comprises a balance valve, a vacuum valve, and a charging valve.

2. The testing device for a service life of an air-conditioning compressor of a new energy vehicle running with pure gas according to claim 1, wherein the PLC of the measurement and control system is connected to a network switch so as to be in communication with a direct-current power supply, a touch screen, and an industrial control machine; the PLC is connected to a peak controller area network (PCAN)-local interconnect network (LIN) module by means of an extended RS232 interface so as to be in communication with a driver of a testing compressor, the testing compressor is controlled to be turned on and off, and a rotation speed is controlled; the PLC is connected to a relay so as to control the direct-current power supply, a recovery compressor, an environmental circulating fan, and various valves; the PLC is connected to a solid-state relay so as to control an air return tank electric heating pipe and an environmental temperature electric heating pipe; the PLC controls forward and reverse rotation of an electronic expansion valve driver so as to control a pulse number of an electronic expansion valve; the PLC is connected to a thermocouple input module by means of an RS485 interface so as to collect temperature data; the PLC is connected to an analog quantity input module by means of the RS485 interface, and the analog quantity input module is connected to a sensor so as to collect pressure, current and voltage data; and the PLC is connected to the sensor by means of an extended analog quantity input/output module so as to collect current and pressure data and control output pressure of an electrical proportional valve.

3. The testing device for a service life of an air-conditioning compressor of a new energy vehicle running with pure gas according to claim 1, wherein the testing environment room is equipped with a testing compressor, an environmental circulating fan is provided right above the testing environment room, and an environmental temperature electric heating pipe and an environmental refrigeration subsystem evaporator are provided on a side face of the testing environment room; the environmental circulating fan is configured to ensure air circulation in the testing environment room so as to achieve uniform temperature distribution in the testing environment room; and the environmental temperature electric heating pipe and the environmental refrigeration subsystem evaporator are configured to control a temperature of the testing environment room so as to achieve arbitrary control of the temperature of the testing environment room in a range of −30° C.-120° C.

4. The testing device for a service life of an air-conditioning compressor of a new energy vehicle running with pure gas according to claim 1, wherein a connection relation of the alternative refrigeration system specifically satisfies the conditions: a discharge end of the testing compressor is connected to a discharge pressure gauge, and the discharge end of the testing compressor is connected to the three discharge throttle valves connected in parallel, wherein a front portion of the third discharge throttle valve is connected to the first electromagnetic valve, rear portions of the three discharge throttle valves are connected to the intermediate buffer coil pipe, and a rear portion of the intermediate buffer coil pipe is connected to the first suction throttle valve, the second suction throttle valve, and the electronic expansion valve connected in parallel, wherein a front portion of the second suction throttle valve is connected to the second electromagnetic valve, a rear portion of the suction throttle valve is connected to the air return tank, and the air return tank is internally provided with the air return tank electric heating pipe and the evaporation coil pipe, so as to control the suction temperature of the testing compressor; an outlet of the air return tank is connected to a suction end of the testing compressor; the suction end is connected to a suction pressure gauge; the recovery subsystem comprises the recovery valve, the recovery compressor, the recovery subsystem condenser, and the recovery liquid storage tank; one end of the recovery valve is connected to the discharge end of the testing compressor, the other end of the recovery valve is connected to a suction end of the recovery compressor, the discharge end of the recovery compressor is connected to the recovery subsystem condenser, and a rear portion of the recovery subsystem condenser is connected to the recovery liquid storage tank configured to store recovered refrigerant; the air return refrigeration subsystem comprises the air return refrigeration compressor, the air return unit condenser, the air return unit expansion valve, and the evaporation coil pipe, pressure gauges are connected to a discharge end and a suction end of the air return refrigeration compressor, the environmental refrigeration subsystem comprises the environmental refrigeration compressor, the environmental unit condenser, the environmental unit expansion valve, and the environmental unit evaporator, and pressure gauges are connected to a suction end and a discharge end of the environmental refrigeration compressor; the auxiliary part comprises the balance valve, the vacuum valve, and the charging valve; one end of the balance valve is connected to the suction end of the testing compressor, the other end of the balance valve is connected to the discharge end of the testing compressor, one end of the vacuum valve is connected to the main refrigeration cycle system, the other end of the vacuum valve is connected to a vacuum pump, and the vacuum valve is opened such that the vacuum pump vacuumizes the main refrigeration cycle system; and one end of the charging valve is connected to the suction end of the testing compressor, the other end of the charging valve is connected to the recovery liquid storage tank, and the charging valve is opened such that refrigerant is added into the main refrigeration cycle system.

5. A testing method for the testing device for a service life of an air-conditioning compressor of a new energy vehicle running with pure gas according to claim 1, wherein a working condition test of a testing compressor comprises two stages, a first stage is a fixed rotation speed test condition, a second stage is a cyclic rotation speed test condition, and the method specifically comprises the following steps:

(1) mounting the testing compressor: mounting the testing compressor in a testing environment room, and connecting a suction end and a discharge end of the testing compressor to a main refrigeration cycle system;

(2) setting test working condition parameters: opening a parameter setting interface on a touch screen, setting basic parameters and the test working condition parameters of the testing compressor, and inputting corresponding communication messages;

(3) entering a fixed rotation speed test stage: initializing the fixed rotation speed test condition with a code n=1;

(4) initializing parameters of the fixed rotation speed test condition n;

(5) adjusting suction pressure, discharge pressure, a suction temperature, and an environmental temperature;

(6) determining whether the suction pressure, the discharge pressure, the suction temperature and the environmental temperature reach a set value of the fixed rotation speed test condition n; if not, returning to step 5 to continue adjustment; and if yes, proceeding to the next step;

(7) starting testing under the fixed rotation speed test condition n;

(8) collecting data: sampling various required data at a high speed by the testing device;

(9) determining whether testing time reaches set time of the fixed rotation speed test condition n; if not, returning to step 8 to continue data collection; and if yes, proceeding to the next step;

(10) determining whether testing under the fixed rotation speed test condition is completed; if not, adding 1 to a code of the fixed rotation speed test condition, and then returning to step 4 to start new testing under the fixed rotation speed test condition; and if yes, entering a cyclic rotation speed test;

(11) entering a cyclic rotation speed test stage: initializing the cyclic rotation speed test condition with a code n=1;

(12) initializing parameters of the cyclic rotation speed test condition n;

(13) adjusting suction pressure, discharge pressure, a suction temperature, and an environmental temperature;

(14) determining whether the suction pressure, the discharge pressure, the suction temperature and the environmental temperature reach a set value of the cyclic rotation speed test condition n; if not, returning to step 13 to continue adjustment; and if yes, proceeding to the next step;

(15) starting testing under the cyclic rotation speed test condition n;

(16) making a rotation speed rise from 0 rpm to a minimum rotation speed within 30 s;

(17) keeping the rotation speed to be the minimum rotation speed;

(18) determining whether a duration of the minimum rotation speed reaches 1 min; if not, returning to step 17; and if yes, proceeding to the next step;

(19) making the rotation speed rise by 1000 rpm within 15 s;

(20) keeping the rotation speed to be a rotation speed after speed rise;

(21) determining whether a duration of the rotation speed reaches 1 min after speed rise; if not, returning to step 20; and if yes, proceeding to the next step;

(22) determining whether the rotation speed reaches a maximum rotation speed; if not, returning to step 19 to continue to make the rotation speed rise; and if yes, proceeding to the next step;

(23) determining whether set time of the cyclic rotation speed test condition n is reached; if not, making the rotation speed fall from the maximum rotation speed to 0 rpm within 30 s, keeping the rotation speed for 30 s, and returning to step 16 to continue testing; and if yes, proceeding to the next step;

(24) determining whether testing under the cyclic rotation speed test condition is completed; if not, adding 1 to a code of the cyclic rotation speed test condition, and then returning to step 12 to start new testing under the cyclic rotation speed test condition; and if yes, proceeding to the next step;

(25) stopping testing; and

(26) saving data and generating a report: saving testing data in an industrial control machine by means of a network switch, and automatically generating a testing report.

6. The testing method for a service life of an air-conditioning compressor of a new energy vehicle running with pure gas according to claim 5, wherein a process of controlling the suction pressure comprises:

when the suction pressure is low, step one, determining whether suction pneumatic pressure is smaller than a maximum value 0.9 Mpa output from a suction pneumatic pressure electrical proportional valve, and under the condition that the suction pneumatic pressure is smaller than 0.9 Mpa, increasing the suction pneumatic pressure; under the condition that the suction pneumatic pressure is not smaller than 0.9 Mpa, step two, determining whether a second electromagnetic valve is opened, and under the condition the second electromagnetic valve is not opened, opening the second electromagnetic valve; under the condition that the second electromagnetic valve is opened, step three, determining whether discharge pneumatic pressure is smaller than a maximum value 0.9 Mpa output from a discharge pneumatic pressure electrical proportional valve, under the condition that the discharge pneumatic pressure is smaller than 0.9 Mpa or equal to 0.9 Mpa, and a first electromagnetic valve is closed, step four, determining whether the discharge pressure is greater than set discharge pressure, and under the condition that the discharge pressure is greater than a set value, conducting no operations; under the condition that the discharge pressure is not greater than the set value, step five, determining whether intermediate pressure is smaller than 0.9 Mpa, and under the condition that the intermediate pressure is smaller than 0.9 Mpa, indicating that there is not enough refrigerant in the main refrigeration cycle system and the charging valve needs to be opened to add refrigerant into the main refrigeration cycle system; under the condition that the intermediate pressure is equal to 0.9 Mpa, step six, determining whether a pulse number of an electronic expansion valve is smaller than 2000, and under the condition that the pulse number is smaller than 2000, increasing an opening degree of the electronic expansion valve; under the condition that the pulse number is not smaller than 2000, indicating that an evaporation temperature is too high and an alarm is given since the evaporation temperature is too high; under the condition that the discharge pneumatic pressure reaches the maximum value 0.9 Mpa output from the discharge pneumatic pressure electrical proportional valve and the first electromagnetic valve is opened, step seven, determining whether the pulse number of the electronic expansion valve is smaller than 2000, and under the condition that the pulse number is smaller than 2000, increasing the opening degree of the electronic expansion valve; and under the condition that the pulse number is not smaller than 2000, indicating that the evaporation temperature is too high and an alarm is given since the evaporation temperature is too high; and alternatively, when the suction pressure is high, step one, determining whether suction pneumatic pressure is greater than a minimum value 0.01 Mpa output from a suction pneumatic pressure electrical proportional valve, and under the condition that the suction pneumatic pressure is greater than 0.01 Mpa, decreasing the suction pneumatic pressure; under the condition that the suction pneumatic pressure is not greater than 0.01 Mpa, step two, determining whether a second electromagnetic valve is closed, and under the condition that the second electromagnetic valve is not closed, closing the second electromagnetic valve; under the condition that the second electromagnetic valve is closed, step three, determining whether a pulse number of an electronic expansion valve is greater than 0, and under the condition that the pulse number is greater than 0, decreasing an opening degree of the electronic expansion valve; and under the condition that the pulse number is not greater than 0, indicating that an evaporation temperature is too low and an alarm is given since the evaporation temperature is too low.

7. The testing method for a service life of an air-conditioning compressor of a new energy vehicle running with pure gas according to claim 5, wherein a process of controlling the discharge pressure comprises:

when the discharge pressure is low, step one, determining whether discharge pneumatic pressure is greater than a minimum value 0.01 Mpa output from a discharge pneumatic pressure electrical proportional valve, and under the condition that the discharge pneumatic pressure is greater than 0.01 Mpa, decreasing the discharge pneumatic pressure; under the condition that the discharge pneumatic pressure is not greater than 0.01 Mpa, step two, determining whether a first electromagnetic valve is closed, and under the condition that the first electromagnetic valve is not closed, closing the first electromagnetic valve; and under the condition that the first electromagnetic valve is closed, indicating that there is not enough refrigerant in the main refrigeration cycle system and the charging valve needs to be opened to add refrigerant into the main refrigeration cycle system; and alternatively, when the discharge pressure is high, step one, determining whether discharge pneumatic pressure is smaller than a maximum value 0.9 Mpa output from a discharge pneumatic pressure electrical proportional valve, and under the condition that the discharge pneumatic pressure is smaller than 0.9 Mpa, increasing the discharge pneumatic pressure; under the condition that the discharge pneumatic pressure is not smaller than 0.9 Mpa, step two, determining whether a first electromagnetic valve is opened, and under the condition that the first electromagnetic valve is not opened, opening the first electromagnetic valve; and under the condition that the first electromagnetic valve is opened, indicating that there is too much refrigerant in the main refrigeration cycle system and the recovery valve needs to be opened to recover refrigerant.

8. The testing method for a service life of an air-conditioning compressor of a new energy vehicle running with pure gas according to claim 6, wherein a control process of automatically adding refrigerant comprises:

during automatic charging, step one, opening the charging valve; step two, determining whether a timer of the charging valve is turned on, and under the condition that the timer of the charging valve is not turned on, turning on the timer of the charging valve; step three, determining whether the discharge pressure is greater than the set discharge pressure, and under the condition that the discharge pressure is greater than a set value, closing the charging valve, and stopping and resetting the timer of the charging valve; under the condition that the discharge pressure is not greater than a set value, step four, determining whether the timer of the charging valve is smaller than 5 s, and under the condition that the timer of the charging valve is smaller than 5 s, continuing timing; under the condition that the timer of the charging valve is not smaller than 5 s, step five, determining whether a recovery compressor is turned on, under the condition that the recovery compressor is not turned on, turning on the recovery compressor, and turning on a timer of the recovery compressor; under the condition that the recovery compressor is turned on, step six, determining whether the timer of the recovery compressor is smaller than 5 s, and under the condition that the timer of the recovery compressor is smaller than 5 s, continuing turning on the recovery compressor; and under the condition that the timer of the recovery compressor is not smaller than 5 s, indicating that charging is abnormal and the charging valve needs to be closed, stopping and resetting the timer of the charging valve, and displaying abnormal charging information on a main interface of measurement and control software.

9. The testing method for a service life of an air-conditioning compressor of a new energy vehicle running with pure gas according to claim 7, wherein a control process of automatically recovering refrigerant comprises:

during automatic recovery, step one, opening the recovery valve; step two, determining whether a timer of the recovery valve is turned on, and under the condition that the timer of the recovery valve is not turned on, turning on the timer of the recovery valve; step three, determining whether the discharge pressure is smaller than the set discharge pressure, and under the condition that the discharge pressure is smaller than a set value, closing the recovery valve, and stopping and resetting the timer of the recovery valve; under the condition that the discharge pressure is not smaller than a set value, step four, determining whether the timer of the recovery valve is smaller than 5 s, and under the condition that the timer of the recovery valve is smaller than 5 s, continuing timing; under the condition that the timer of the recovery valve is not smaller than 5 s, step five, determining whether a recovery compressor is turned on, under the condition that the recovery compressor is not turned on, turning on the recovery compressor, and turning on a timer of the recovery compressor; under the condition that the recovery compressor is turned on, step six, determining whether the timer of the recovery compressor is smaller than 5 s, and under the condition that the timer of the recovery compressor is smaller than 5 s, continuing turning on the recovery compressor; and under the condition that the timer of the recovery compressor is not smaller than 5 s, indicating that recovery is abnormal and the recovery valve needs to be closed, stopping and resetting the timer of the recovery valve, and displaying abnormal recovery information on a main interface of measurement and control software.

\* \* \* \* \*